United States Patent [19]

Wiskamp et al.

[11] Patent Number: 5,140,056
[45] Date of Patent: Aug. 18, 1992

[54] ALKALI OR ALKALINE EARTH SALTS OF SULFOSUCCINIC ACID ESTERS AS INTERNAL ANTISTATIC AGENTS, TAKE-OFF AND WINDING AIDS FOR TRANSPARENT POLYCARCONATE FILMS

[75] Inventors: Volker Wiskamp, Muelheim/Ruhr; Dittmar Nerger; Bernhard Schulte, both of Krefeld; Werner Waldenrath, Cologne, all of Fed. Rep. of Germany

[73] Assignee: Bayer Aktiengesellschaft, Leverkusen, Fed. Rep. of Germany

[21] Appl. No.: 483,184

[22] Filed: Feb. 21, 1990

Related U.S. Application Data

[63] Continuation of Ser. No. 262,381, Oct. 25, 1988, abandoned.

[30] Foreign Application Priority Data

Oct. 30, 1987 [DE] Fed. Rep. of Germany ....... 3736749

[51] Int. Cl.$^5$ ................................................ C08K 5/42
[52] U.S. Cl. ................................. 524/161; 524/162; 524/164; 524/166; 524/910; 524/911
[58] Field of Search ............ 524/910, 911, 161, 162, 524/164, 166; 428/409, 412; 427/115.63, 115.64; 264/216

[56] References Cited

U.S. PATENT DOCUMENTS

| | | | |
|---|---|---|---|
| 3,259,520 | 7/1966 | Borman | 117/138.8 |
| 3,355,313 | 11/1967 | Eastes | 524/166 |
| 3,560,591 | 2/1971 | Tanaka et al. | 260/560 |
| 3,931,100 | 1/1976 | Mark | 260/45.7 |
| 3,978,024 | 8/1976 | Mark | 524/162 |
| 4,007,155 | 2/1977 | Mark | 260/45.7 |
| 4,073,768 | 2/1978 | Mark | 260/45.7 |
| 4,093,590 | 6/1978 | Mark | 260/45.85 |
| 4,098,754 | 7/1978 | Neuray et al. | 260/37 |
| 4,315,081 | 2/1982 | Kobayashi | 524/910 |
| 4,450,249 | 5/1984 | Schmidt et al. | 524/910 |
| 4,696,971 | 9/1987 | Degeilh | 525/61 |

FOREIGN PATENT DOCUMENTS

| | | |
|---|---|---|
| 3004017 | 8/1981 | Fed. Rep. of Germany . |
| 58-125741 | 7/1983 | Japan . |
| 52-195029 | 8/1987 | Japan . |
| 852923 | 11/1960 | United Kingdom . |

OTHER PUBLICATIONS

Merck Index, 10th Edition, p. 3409.

*Primary Examiner*—Veronica P. Hoke
*Attorney, Agent, or Firm*—Joseph C. Gil; Aron Preis

[57] ABSTRACT

The invention relates to the use of salts of sulfosuccinic acid esters as internal antistatic agents, take-off and winding aids for transparent cast films of polycarbonates, to a process for the production of cast polycarbonate films and to the cast polycarbonate films themselves containing salts of sulfosuccinic acids and also to the use of the new cast polycarbonate films in the electrical field and optical field.

4 Claims, No Drawings

ALKALI OR ALKALINE EARTH SALTS OF SULFOSUCCINIC ACID ESTERS AS INTERNAL ANTISTATIC AGENTS, TAKE-OFF AND WINDING AIDS FOR TRANSPARENT POLYCARBONATE FILMS

This application is a continuation of application Ser. No. 262,381, filed Oct. 25, 1988, now abandoned.

This invention relates to the use of alkali salts or alkaline earth salts of sulfosuccinic acid esters corresponding to the following formula

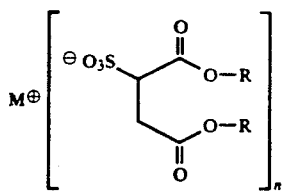

in which

M is an alkali metal cation and n is 1 or

M is an alkaline earth metal cation and n is 2 and

R is a $C_4$–$C_{20}$ alkyl, $C_4$–$C_{20}$ alkenyl, $C_6$–$C_{20}$ cycloalkyl or $C_6$–$C_{20}$ cycloalkenyl radical, as internal antistatic agents, take-off and winding aids for transparent cast films of high molecular weight, thermoplastic, aromatic polycarbonates in quantities of 0.01 to 2% by weight and preferably in quantities of 0.05 to 1% by weight, based on the total weight of polycarbonate and salt corresponding to formula 1.

In addition, polycarbonate films containing salts of formula 1 in such quantities are hardly affected in their transparency, i.e. have a haze value of, for example, 0% to at most 2% (as measured in accordance with ASTM-D-1003).

The antistatic properties are reflected in the fact that the surface resistance (as measured in accordance with DIN 53 482) is less than $10^{14}$ ohm.

Accordingly, the added salts act on the one hand as internal antistatic agents by lowering the surface resistance of the film without affecting the specific resistivity $\rho_D$ and without damaging the polycarbonate.

On the other hand, the effect of the added salts is that the film can be taken more easily off the casting substrate, such as for example polished or roughened materials, such as steel or chromium, in the form of casting drums or belts, can be better guided over the rollers of subsequent dryers and can be better wound in conventional winding machines.

The use of sulfonic acid esters as antistatic agents in polycarbonate films is known from DE-OS 29 31 172 and from DE-OS 30 04 017. However, films such as these generally have relatively high haze values.

In addition, DE-OS 24 58 968 describes the addition of alkali or alkaline earth sulfonates of phenolsulfonic acid esters to polycarbonates, which provides the polycarbonates with flame-retarding properties. The sulfonates used include, in one Example, disodium-bis-(4-chlorophenyl)-2,2'in one Example, disodium-bis-(4-chlorophenyl)-2,2'-succinate disulfonate (page 11 of DE-OS 24 58 968).

Salts of this type also generally produce relatively high haze values in the polycarbonate.

DE-OS 26 48 131 describes non-opaque flame-retarding polycarbonate compositions containing alkali and alkaline earth metal salts of phenol ester sulfonic acids, the polycarbonate and the salt having a refractive index of 1.54 to 1.65. There is no mention of succinates.

In addition, DE-OS 24 60 052 describes the production of non-inflammable thermoplastic polycarbonates produced by the addition of soluble basic alkali salts. Suitable alkali salts are inter alia alkali salts of succinic acid (page 8 of DE-OS 24 60 052). These salts are incorporated at temperatures of 250° to 400° C. and bring about non-inflammability by partial crosslinking of the polycarbonates.

From DE-OS 2 653 327 and from DE-OS 2 460 787 polycarbonate compositions are known containing alkali- or earthalkali-metal salts of aliphatic sulphonic acids. The purpose for the addition of these salts is the improvement of flame retardancy of the polycarbonates.

In addition, it is known that films or moldings can be antistatically finished by subsequent treatment with an external antistatic agent, for example by coating a film with a solution of an antistatic chemical. It is possible in this way to reduce the surface resistance $R_{OA}$ of the film or molding and to prevent or completely avoid any electrostatic charging (cf. GB 852,923 or NE 6 411 681).

However, films such as these show adequate antistatic behavior only briefly because the surface coating of antistatic agent can be rapidly removed again by weathering and external mechanical influences.

Another method of antistatically finishing films or moldings is to apply a conductive layer of, for example, carbon black or metal. This reduces the transparency of the films and makes then susceptible to any external mechanical stressing which can easily cause flaking or tearing of the coating.

It is also known that the surface resistance $R_{OA}$ of films can be reduced by incorporation of carbon black in quantities by weight of up to 30%.

Black-colored films such as these show a distinct deterioration in their mechanical properties. The reduction in the surface resistance $R_{OA}$ of the film is accompanied by a reduction in its volume resistivity $\rho_D$, so that the film cannot be used, for example, as an electrical insulating material.

In addition, it is known that the general tendency of polycarbonate films to stick to rollers and to block during winding can be reduced by incorporation of lubricants (antiblocking agents) in the films.

Silica gels or talcum are examples of antiblocking agents which have been used in the past. These inorganic materials have two main disadvantages: firstly, they are not soluble in the polymer and, accordingly, lead to distinct hazing of the film; secondly, they are difficult to disperse uniformly in the polymer so that agglomerates of the salts are frequently formed and the film as a whole becomes inhomogeneous and shows deteriorated mechanical properties.

It has surprisingly been found that, as mentioned at the beginning, polycarbonate films containing 0.01 to 2% by weight and preferably 0.05 to 1% by weight, based on the total weight of polycarbonate and added salt, of an alkali or alkaline salt of a sulfosuccinic acid ester corresponding to formula 1 show a reduced surface resistance $R_{OA}$, their volume resistivity $\rho_D$ corresponding to the values of the additive-free film. In addition, the films show distinctly better take-off and winding behavior than a pure polycarbonate film. At the same time, the haze of the films differs only negligibly from that of an additive-free film.

In the context of the invention, aromatic polycarbonates are understood to be homopolycarbonates and copolycarbonates based, for example, on one or more of the following bisphenols: hydroquinone, resorcinol, dihydroxydiphenyls, bis(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones, α,α'-bis-(hydroxyphenyl)-diisopropylbenzenes and also nucleus-alkylated and nucleus-halogenated compounds thereof. These and other suitable aromatic dihydroxy compounds are described, for example, in U.S. Pat. Nos. 3,028,365, 2,999,835, 3,148,172, 3,275,601, 2,991,273, 3,271,367, 3,062,781, 2,970,131 and 2,999,846, in DE-OSS 15 70 703, 20 63 050, 20 63 052, 22 11 956, 22 11 977, in FR-PS 1 156 518 and the book by H. Schnell entitled "Chemistry and Physics of Polycarbonates", Interscience Publishers, New York, 1964.

Preferred bisphenols correspond to the following formula

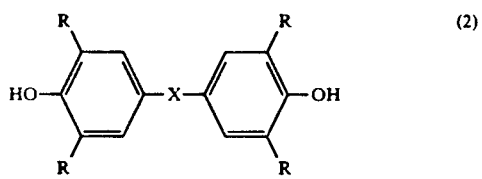

in which the substituents R may be the same or different and represent H, $C_1$–$C_4$ alkyl, Cl or Br and in which X is a bond, a $C_1$–$C_8$ alkylene radical, a $C_2$–$C_8$ alkylidene radical, a $C_5$–$C_{15}$ cycloalkylene radical, a $C_5$–$C_{15}$ cycloalkylidene radical, —$SO_2$ or

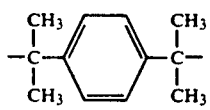

Examples of these bisphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred bisphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those based on one or more of the preferred bisphenols mentioned above. Particularly preferred copolycarbonates are based on 2,2-bis-(4-hydroxyphenyl)-propane and one of the other bisphenols mentioned is particularly preferred. Polycarbonates based solely on 2,2-bis-(4-hydroxyphenyl)-propane or 2,2-bis-(3,5-dimethyl-4-hydroxyphenyl)-propane are also particularly preferred.

The aromatic polycarbonates may be prepared by known methods, for example by transesterification in the melt from bisphenols and diphenylcarbonate and by the two-phase interfacial method from bisphenols and phosgene, as described in the literature mentioned above.

The aromatic polycarbonates may also be branched through the incorporation of small quantities of polyhydroxy compounds, for example 0.05 to 2.0 mol-% (based on the bisphenols used). Polycarbonates of this type are described, for example, in DE-OSS 15 70 533, 15 95 762, 21 16 974, 21 13 347, in GB-PS 1,079,821 and in U.S. Pat. No. 3,544,514. Some of the polyhydroxy compounds which may be used are, for example, phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenylisopropyl)-phenol, 2,6-bis-(2'-hydroxy-5'-methylbenzyl)-4-methylphenol, 2,4-dihydroxybenzoic acid, 2-(4-hydroxyphenyl)-2-(2,4-dihydroxyphenyl)-propane and 1,4-bis-(4',4''-dihydroxytriphenylmethyl)-benzene.

The aromatic polycarbonates should have molecular weights $M_w$ of generally from 10,000 to more than 200,000 and preferably from 20,000 to 80,000.

Alkali and alkaline earth salts suitable for the purposes of the invention are lithium, sodium, potassium, calcium, magnesium or barium salts corresponding to general formula 1 above. Sodium bis-(2-ethylhexyl)-sulfosuccinate

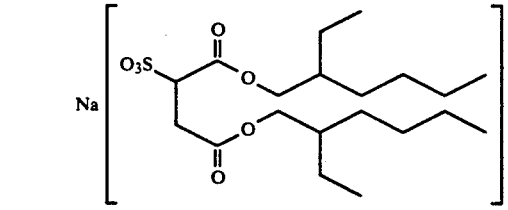

is particularly preferred.

Where it is not known from the literature, the production of the salts of formula 1 suitable for use in accordance with the invention is carried out by neutralization of the corresponding free acids with the corresponding alkali or alkaline earth hydroxides in known manner, for example in $H_2O$ or $H_2O$/alcohol mixtures. The salts are isolated in known manner.

The salts corresponding to formula 1 are incorporated through the solutions of the thermoplastic polycarbonates in standard polycarbonate solvents, such as $CH_2Cl_2$, chlorobenzene or mixtures of $CH_2Cl_2$ and chlorobenzene.

Accordingly, the salt of formula 1 may also be dissolved in the polycarbonate solvent and then added in the necessary quantities to the separately prepared polycarbonate solution.

The solutions of polycarbonates in standard organic polycarbonate solvents, which are directly obtainable in the production of the polycarbonates by the two-phase interfacial method and which are washed until neutral, may also be directly used, i.e. without isolation of the polycarbonate, for mixing with the solutions of the salts corresponding to formula 1. The salts of formula 1 may also be added to the polycarbonate solutions as such or in solution in solvents.

Cast polycarbonate films may then be prepared in a certain way from the polycarbonate solutions (cf. for example DE-AS 12 74 274 and DE-OS 25 17 032).

Accordingly, the present invention also relates to a process for the production of cast polycarbonate films which is characterized in that solutions of thermoplastic aromatic polycarbonates in their standard solvents are mixed with salts of formula 1 in quantities of 0.01 to 2% by weight and preferably in quantities of 0.05 to 1% by weight, based on the total weight of polycarbonate plus salt of formula 1, either as such or in solution in polycarbonate solvents and the resulting mixture subsequently processed in known manner to cast films.

The present invention also relates to cast polycarbonate films containing 0.01 to 2% by weight and preferably 0.05 to 1% by weight of salts corresponding to formula 1, based on the total weight of polycarbonate plus salt.

Suitable polycarbonate solutions for the production of the cast polycarbonate films should have a concentration of from about 10 to 15% by weight, based on polycarbonate plus solvent.

The cast polycarbonate films according to the invention should preferably have a thickness of from about 10 $\mu$m to 200 $\mu$m.

In addition to the salts of formula 1, other standard additives, such as UV stabilizers or heat stabilizers, may also be added to the polycarbonate solutions before production of the cast films.

The cast polycarbonate films according to the invention are used in known fields of application for polycarbonates, but especially in the electrical field, the glazing field and, above all, in the optical field.

The films of polycarbonate solution used in the Examples have layer thicknesses of 50 $\mu$m to 100 $\mu$m and consist of a homopolycarbonate based on 2,2-bis-(4-hydroxyphenyl)-propane with a weight average molecular weight Mw of 57,000 (PC calibration) and a relative solution viscosity $n_{rel}$ of 1.75, as measured on a 0.5% solution in methylene chloride, and were prepared by casting from a methylene chloride solution. Example 1 is the pure PC film and is intended for comparison purposes.

The additive according to the invention (Na-bis-(2-ethylhexyl)-sulfosuccinate) is known from the literature (Merck Index 10, 3409) and was dissolved in methylene chloride and added to the polycarbonate solution before casting. The surface resistance ($R_{OA}$) tests described in the Examples were carried in accordance with DIN 53 482 at 23° C./50% relative air humidity.

Haze values were measured in accordance with ASTM-D-1003.

EXAMPLES

| Example | Additive (% by weight) | $R_{OA}$ (ohms) | $\rho_D$ (ohms) | Haze [%] |
|---|---|---|---|---|
| 1 | — | $\sim 10^{15}$ | $>10^{16}$ | 0–1 |
| 2 | 0.1 | $3.0 \cdot 10^{13}$ | $2.3 \cdot 10^{16}$ | 1 |
| 3 | 0.5 | $83 \cdot 10^{12}$ | $2.0 \cdot 10^{15}$ | 2 |

We claim:

1. A transparent cast polycarbonate film consisting essentially of a polycarbonate resin and 0.01 to 2 percent of an alkali salt or an alkaline earth salt of sulfosuccinic acid esters corresponding to the following formula

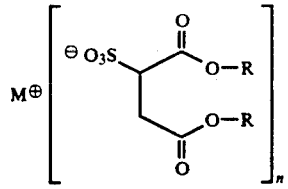

in which
M is an alkali metal cation and n is 1 or
M is an alkaline earth metal cation and n is 2 and
R is a $C_4$–$C_{20}$ alkyl radical,
said percent being relative to the total weight of said polycarbonate and said salt.

2. The film of claim 1 wherein said salt is present in an amount of 0.05 to 1 percent.

3. A transparent cast polycarbonate film consisting of a polycarbonate resin and 0.01 to 2 percent of an alkali salt or an alkaline earth salt of sulfosuccinic acid esters corresponding to the following formula

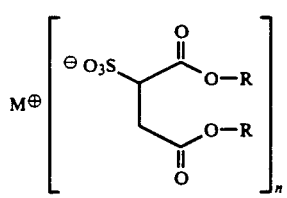

in which
M is an alkali metal cation and n is 1 or
M is an alkaline earth metal cation and n is 2 and
R is a $C_4$–$C_{20}$ alkyl radical,
said percent being relative to the total weight of said polycarbonate and said salt and further consisting of at least one member of the group consisting of standard additives.

4. A transparent cast polycarbonate film consisting of a polycarbonate resin and 0.01 to 2 percent of an alkali salt or an alkaline earth salt of sulfosuccinic acid esters corresponding to the following formula

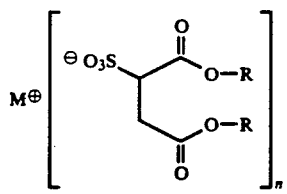

in which
M is an metal cation and n is 1 or
M is an alkaline earth metal cation and n is 2 and
R is a $C_4$–$C_{20}$ alkyl radical,
said percent being relative to the total weight of said polycarbonate and said salt and further consisting of at least one member selected from the group consisting of a UV stabilizer and a heat stabilizer.

* * * * *